(12) United States Patent
Marshall

(10) Patent No.: US 6,213,054 B1
(45) Date of Patent: Apr. 10, 2001

(54) HELICAL PERCH BIRD FEEDER

(76) Inventor: Patrick T. Marshall, 1851 Redleaf Ct., Beavercreek, OH (US) 45432

( * ) Notice: Subject to any disclaimer, the term of this patent is extended or adjusted under 35 U.S.C. 154(b) by 0 days.

(21) Appl. No.: 08/826,861

(22) Filed: Apr. 11, 1997

Related U.S. Application Data

(60) Provisional application No. 60/021,759, filed on Jul. 15, 1996.

(51) Int. Cl.$^7$ .................................................. A01K 39/01
(52) U.S. Cl. ............................................................ 119/57.8
(58) Field of Search ................................. 119/57.8, 469, 119/428, 702, 430, 52.2, 52.3, 57.9, 51.03; D30/124, 128

(56) References Cited

U.S. PATENT DOCUMENTS

| | | | |
|---|---|---|---|
| D. 407,173 | * | 3/1999 | Marshall .............................. D30/124 |
| 2,779,311 | * | 1/1957 | Hamilton . |
| 2,808,807 | * | 10/1957 | Winton et al. . |
| 5,156,112 | * | 10/1992 | Brown .................................. 119/57.9 |
| 5,195,459 | * | 3/1993 | Ancketill .............................. 119/57.9 |
| 5,406,908 | | 4/1995 | Burleigh .............................. 119/57.8 |
| 5,435,268 | | 7/1995 | Liethen ................................ 119/57.8 |
| 5,479,878 | | 1/1996 | Coulter ............................... 119/51.03 |
| 5,479,879 | | 1/1996 | Bick ..................................... 119/52.2 |
| 5,887,542 | * | 3/1999 | Sladowski ......................... 119/51.03 |

* cited by examiner

Primary Examiner—Peter M. Poon
Assistant Examiner—Yvonne R. Abbott
(74) Attorney, Agent, or Firm—Donald P. Gillette

(57) ABSTRACT

A bird feeder that includes a container having feed-access openings and a generally helical member attached to the container to extend around it along a path such that, for each of the openings, a portion of the member is close enough and in the proper location to allow a bird perched on that portion to retrieve seed accessible through that opening.

17 Claims, 6 Drawing Sheets

HELICAL PERCH BIRD FEEDER

CROSS-REFERENCE TO RELATED APPLICATION

This application claims the benefit of the priority of Provisional Application No. 60/021,759, filed on Jul. 15, 1996.

BACKGROUND OF THE INVENTION

1. Field of the Invention

This invention relates to the field of bird feeders and, more specifically, to a bird feeder having a container with feeding openings and a generally helical member surrounding the container and spaced from it at each of the ports by a distance convenient for birds to use as a helical perch while retrieving feed, which is typically some form of seed, from the feeding openings.

2. The Prior Art

A number of bird feeders of different configurations are available on the market, most of which comprise a hollow cylindrical container, usually of circular cross section, that has feeding access openings or ports spaced apart both longitudinally and angularly to allow several birds at a time to use the same feeder. U.S. Pat. No. 4,996,947 to Petrides; U.S. Pat. No. 5,406,908 to Burleigh; and U.S. Pat. No. 5,435,268 to Leithen show some of the forms of such feeders. In each, a short rod attached to the container in the proximity of each port extends out perpendicularly from the wall of the container to form a perch on which a bird can sit while retrieving seed just inside that port. In most such feeders, including those represented by Burleigh and Leithen, the rods are below the level of the feeding port with which they are associated, but, for certain species, such as goldfinches, the perch rods can be located above the ports, as shown by Petrides.

One of the disadvantages of all such feeders is that the birds sit on or hang from the perches in a direction perpendicular to the perch and are forced to twist approximately 90° to reach into the adjacent access port for seed. In addition to these perpendicular-perch feeders, there is at least one type of commercially available bird feeder that includes a cylindrical container with a T-shaped perch in front of each of its access ports to allow the birds to sit on the cross bar of the T facing the respective port. The cross bars of these T-shaped perches are in radial planes perpendicular to the axis of the cylindrical body.

OBJECTS AND SUMMARY OF THE INVENTION

It is an object of this invention to provide an improved bird feeder having a generally helical perch that extends both around and along a ported seed container and facilitates access through the ports to the seed.

Another object is to provide a bird feeder suitable for use by birds of different sizes and feeding characteristics.

Another object is to provide a bird feeder that includes a generally helical perch surrounding a seed container and attached to it at a minimal number of points to simplify construction of the feeder.

Still another object is to provide a feeder that has a plurality of ports spaced both longitudinally and angularly apart and a single, generally helical member attached to the container and having a configuration that allows the helical member to serve as a perch adjacent a majority of the ports.

It is yet another object to provide a feeder having exchangeable feeding ports of different sizes.

It is still another object of the invention to provide a feeder that utilizes a generally helical perch to support the feeder.

These and other objects of the invention will become apparent from the following description, drawings and claims.

A bird feeder in accordance with this invention includes a feed container that has a wall surrounding a central region, with a plurality of feeding openings, or ports, in the wall through which birds can have access to bird seed inside the container. The ports are spaced apart along the length of the container between the ends thereof, and are so located that a generally helical member extending around and along the body passes near each of the ports. The helical member is spaced from the container by a distance that allows birds perched on it to reach into each port and withdraw bird seed. The distance from the part of the perch closest to an access port is suitable for small birds, while larger birds can accommodate themselves by perching somewhat uphill or downhill from the access ports.

The helical perch can be attached to the feeder by means of separate support pegs fixedly attached to the container and to the helix to maintain the perch at a predetermined distance from the container. Alternatively, by forming the helical perch of sufficiently rigid, yet resilient, wire, one end of the perch can be attached at or near the top of the container, and the other end of the perch can be attached at or near the bottom of the container. With such a arrangement, it is no longer necessary to provide a separate perch for each port.

The invention will be described in greater detail in connection with the drawings, in which like serial numbers in different figures indicate the same item.

DETAILED DESCRIPTION OF THE PREFERRED EMBODIMENTS

Figure 1:
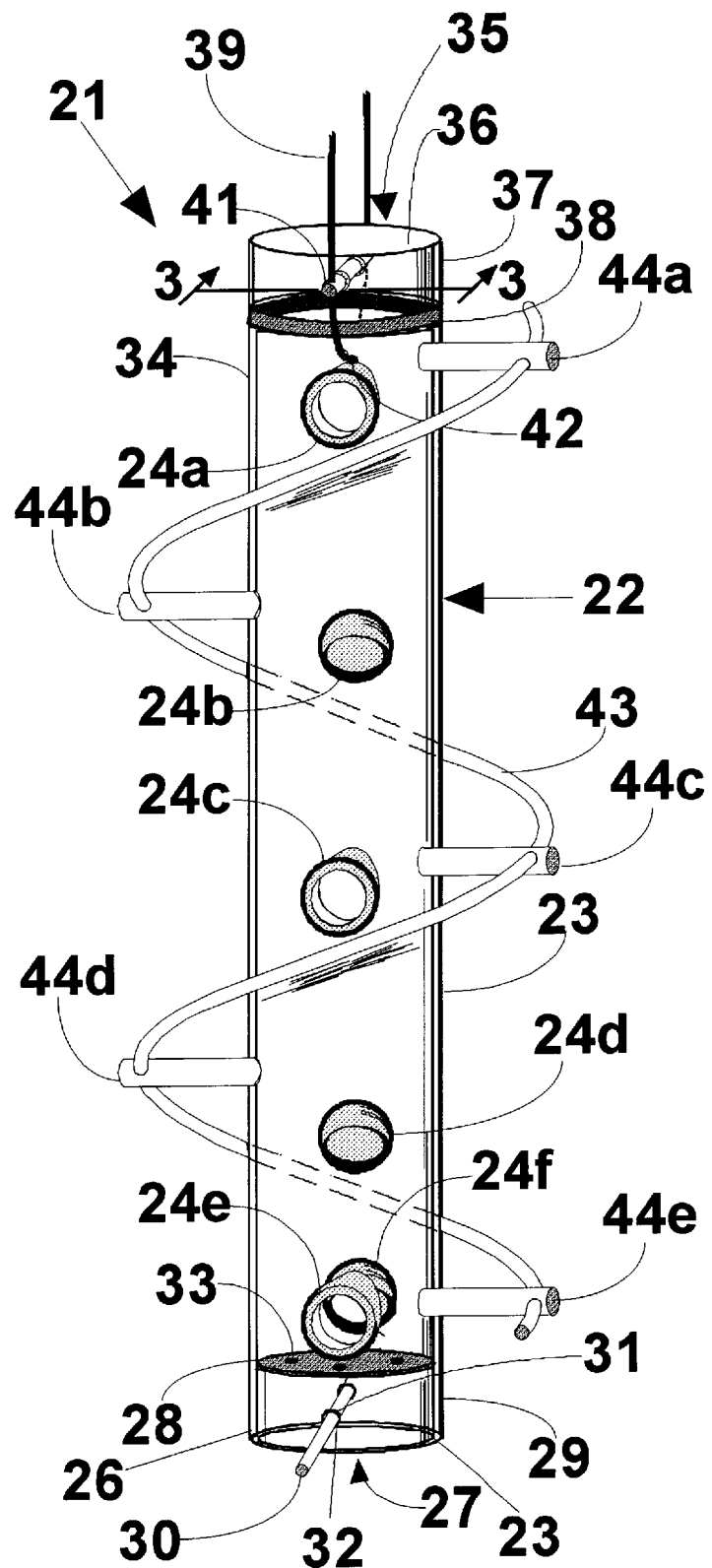
FIG. 1 is a perspective view of one embodiment of the present invention depicting a bird feeder with a helical perch supported by a plurality of pegs mounted on the body of the feeder.
Figure 2:
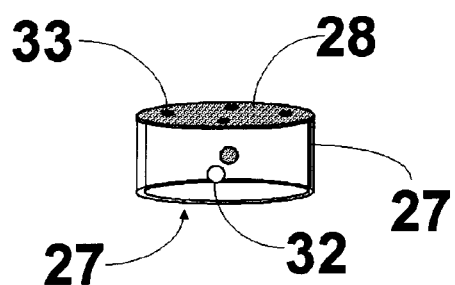
FIG. 2 is a perspective view of a removable lower closure means as used in the bird feeder in FIG. 1.

FIGS. 1–4 illustrate one embodiment of a bird feeder 21 according to the present invention. This embodiment of the feeder includes a seed container 22 that has a transparent, hollow, tubular wall 23 surrounding a central region into which a quantity of seed can be poured. In this embodiment, the container is round, and the wall has a plurality of feeding openings, or ports, 24a–24f spaced apart longitudinally along the body, as well as angularly around it relative to an arbitrary plane through the axis of the tubular wall. In this embodiment, the feeding openings 24 are illustrated as somewhat more complex than mere holes; rather, they are formed separately and then are inserted into holes in the wall 23. The ports 24a, 24c, and 24e are on the part of the wall that happens to be facing forward in this figure, while the ports 24b, 24d and 24f are angularly displaced from the ports 24a, 24c, and 24e. In this embodiment, the displacement angle is 180° but other angles may be used. Furthermore, it is not necessary that any two of the ports face in the same direction. The latter ports are visible in this figure only because the wall 23 is transparent.

The first end region 26 of the container 22, which is the lower end region when the feeder is in use, has closure means 27 in the form of a cup (shown by itself in FIG. 2) comprising a transverse plate 28 and a tubular portion 29. The cup is fitted into the tubular wall 23 in inverted position to hold seed in place in the container and is retained by a transverse pin 30 that extends through holes 31 and 32 in the tubular wall aligned with holes in the skirt 29. By forming the holes 31 directly below the lowest ports 24e and 24f and making the transverse pin long enough, the pin 30 can serve as a perch for birds trying to reach seed behind those ports. The transverse plate 28 has apertures 33 in it to allow water that finds its way into the container, for example, through the ports 24a–24f, to drain out. The closure means 27 may be removed to clean out the container 22 from time to time.

Figure 3:
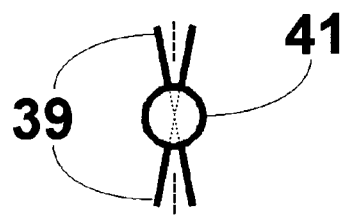
FIG. 3 is a cross-sectional view of a cable support rod along line 3—3 in FIG. 1.

At the other end region 34 of the container, which is the upper end region when the bird feeder 21 is supported for normal use, is another removable closure means 35 in the form of a cap that protects seed in the container 22 from rain, snow, and rodents. The cap has a solid top 36 and a skirt 37 and is joined to the upper end region of the container by a joining rim 38. The bird feeder 21 can be suspended from a tree, a post, a building, or some other suitable structure by means of a support 39, such as aluminum wire or vinyl-coated cable, threaded through holes near the ends of a guide peg 41 and into holes in the upper part of the wall 23. As shown in FIG. 3, the holes in the guide peg are angularly displaced with respect to each other so that, when the cap is removed from the container 22 and is moved up the cable, there is sufficient friction between the cable 39 and the sides of these holes to retain the cap in that raised location while the container 22 is being filled with seed. The cable may be held in place by fasteners 42 crimped on its ends inside the container, or if the cable is a sufficiently rigid wire, its ends may be formed into hooks to engage the wall 23.

The helical perch in this embodiment comprises a rod 43, which has a diameter of about 1/8" to about 1/4", and preferably about 3/16". The rod is wound helically around the container 22 and is fed through holes in a plurality of support pegs 44. These pegs are attached to the container wall along a helical path, and the holes in them through which the rod is fed are also aligned along a helical path that defines the turns of the helix and the distance of those turns from the wall of the container. The helical rod extends a short distance beyond the top and bottom support pegs 44a and 44e, as shown in FIG. 1, and follows a pattern that passes a short distance below, and is spaced outwardly from, each of the seed ports 24a–24d. It has been found satisfactory to space the rod between about 3/4" and about 3", and preferably about 1", below the center of each port and to space the rod between about 1.5" and 2", and preferably about 1.75", out from the wall 23. This allows birds of all sizes to perch comfortably on the helical rod while eating the seed stored inside the container 22, particularly since the birds are free to move up and down along the rod to find the position in which they are most comfortable.

The hollow tubular container 22, the removable cap 35, and the removable lower closure means 27 can all be made of such materials as transparent butyrate or polycarbonate, although the invention is by no means limited to the use of these specific materials.

The seed ports 24 permit birds to eat seed stored inside the container 22 while preventing the seed from emptying out onto the ground. These ports can be cut and polished from longer lengths of small diameter plastic, metal, or wooden tubes or they can be manufactured through the use of plastic-injection molding or extrusion. The outer diameters of the ports 24 should be about the same as the diameters of the corresponding holes in which they are inserted in the container wall 23. As a result, the seed ports can be press-fitted into these holes. The thickness of the wall 23 should be at least about 1/8" to provide proper support for the seed ports 24 in their corresponding holes. The ports can also be glued into the holes, thereby permanently attaching them to the container 22.

Figure 4A:
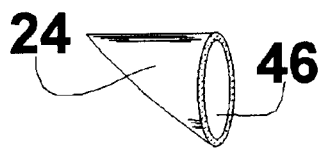
FIGS. 4a and 4b provide perspective views from opposite sides of the seed ports used in the helical perch bird feeder in FIG. 1.
Figure 4B:
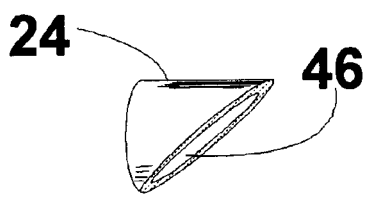

FIGS. 4a and 4b depict detailed views of a seed port 24 of the type used the bird feeder 21 in FIG. 1. FIG. 4a is a front perspective view and FIG. 4b a rear view of the seed port. Plastic seed ports 24 of different size can be manufactured, all having the same outer diameter but with access openings 46 of different diameters. Assuming that the ports are not permanently joined to the wall 23 in FIG. 1, ports having one size of access holes 46 can be substituted for those having access holes of a different size in the same bird feeder. The purpose of this is twofold: to vary the consumption rate of seed eaten through seed ports 24; and to control the types of birds allowed to eat from the feeder 21. The bird seed types can be varied from those as large as sunflower seeds to those as small as thistle seeds simply by utilizing seed ports having different sizes of access holes 46.

Figure 5:
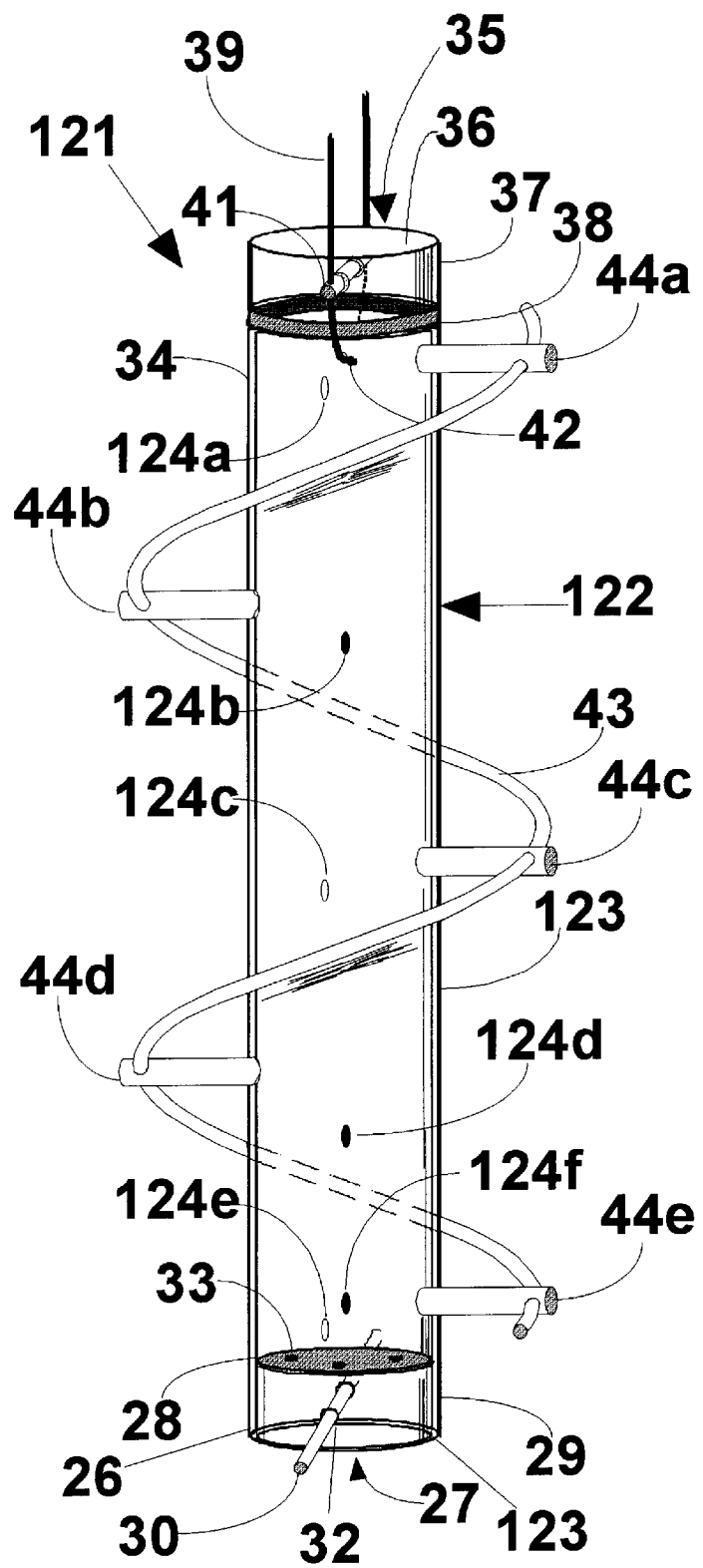
FIG. 5 is a perspective view of a modified version of the feeder FIG. 1 that has small openings for dispensing thistle seed.

FIG. 5 shows a modified feeder 121 that differs from the feeder 21 in FIG. 1 only in that the container 122 has seed access openings 124 simply in the form of short slits formed directly in the wall 123 rather than the more complex ports 24 formed as separate items and then attached to the wall 23 in FIG. 1. The ports 124 are smaller than the holes in the ports 24 and are particularly suitable for dispensing very tiny seeds, such as thistle seeds, that are particularly attractive to certain types of birds. With such small openings, it is unnecessary to have hoods over them, such as the type of hoods shown on the ports in FIGS. 4a and 4b, because there is little tendency for the tiny seeds to fall out. As in the case of the feeder 21 in FIG. 1, the helical rod 43 is preferably positioned at about 1" below the centers of the ports 124.

Figure 6:
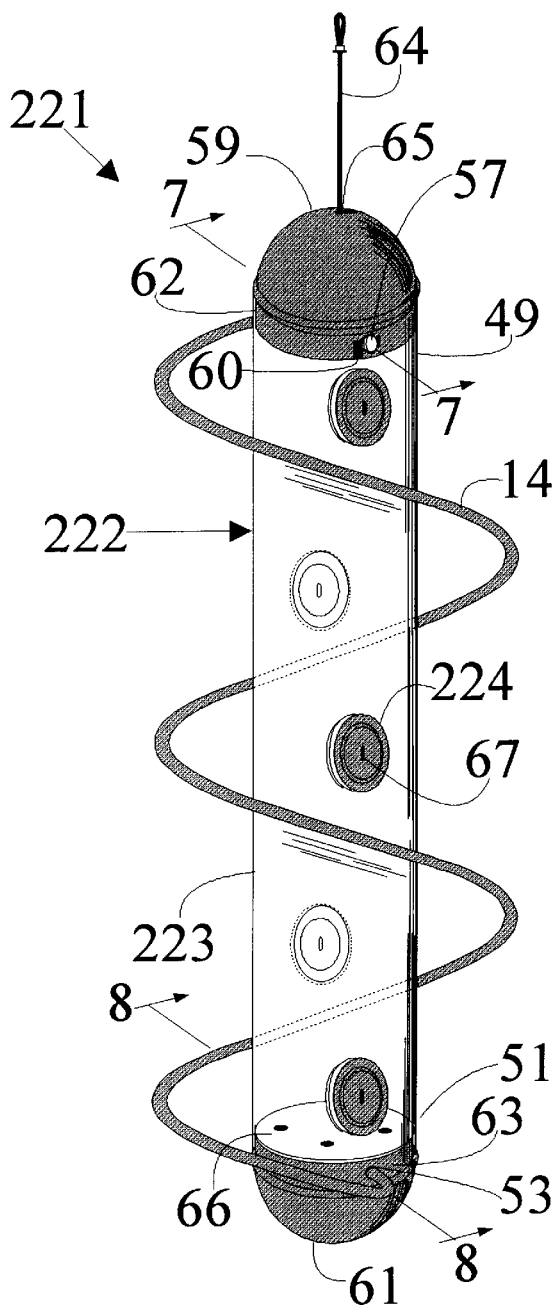
FIG. 6 is a perspective view of another embodiment of the present invention depicting a bird feeder in which the ends of a helical perch are attached near the ends of the container.
Figure 7:
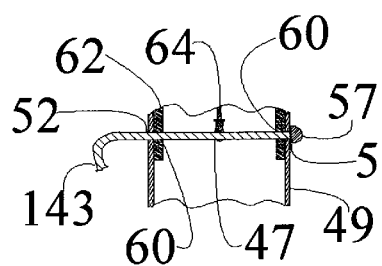
FIG. 7 is a cross-sectional view of a fragment of the top cap along line 7—7 in FIG. 6.
Figure 8:
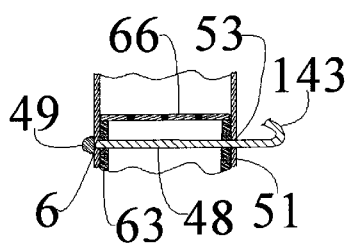
FIG. 8 is a cross-sectional view of the bottom cap along line 8—8 in FIG. 6.
Figure 9:
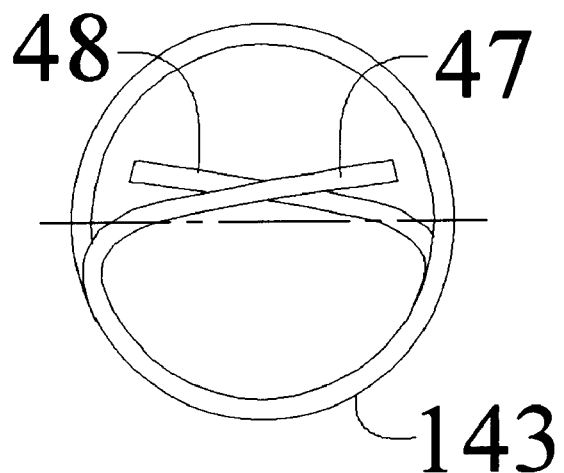
FIG. 9 is an end view of the body of the helical perch in FIG. 6.

FIGS. 6–9 show another embodiment of a bird feeder 221 in accordance with this invention. In place of the helical rod 43 supported by several pegs, the feeder 221 includes a generally helical rod 143, which may be formed of rigid but somewhat resilient material, such as 9-gauge stainless steel wire or 3/16" polycarbonate plastic rod, supported only by its upper and lower ends 47 and 48. These ends directly engage upper and lower end regions 49 and 51 of the wall 223 of a container 222 by entering rod holes 52 and 53, respectively. It is highly desirable that the rod 143 not engage the edges of these holes loosely, and this is partly accomplished by having the ends 47 and 48 long enough to extend through the container and out through holes 54 and 56. In addition, the relative location of the upper pair of holes 52 and 54 should be angularly spaced from the lower pair of holes 53 and 56 by an amount that differs from the angular spacing, if any, between the ends 47 and 48 in the relaxed condition of the helical rod. Depending on the relative angular spacing between the pairs of holes and the rod ends that fit into them, the rod would have to be either forced into a tighter coil or a looser coil in order to insert its ends into the respective pairs of holes. The simplest way to align the pairs of holes 52, 54 and 53, 56 is to make the holes of each pair diametrically opposite each other and, in fact, to form both pairs of holes on the same diametral plane, as is illustrated in FIG. 6. In that case, the ends 47 and 48 should be at an angle with respect to each other, as shown in FIG. 9. The ends of the helical rod 143 may be further secured by top nuts 57 and 58, which can be threaded, if the tips of the ends 47 and 48 are threaded. Alternatively, the top nuts can be speed nuts that merely need to be pushed on the ends 47 and 48.

The container 222 is closed by closure means 59 and 61 in the form of domes that have edges 62 and 63 that fit snugly into its upper and lower ends 49 and 51. The domes have ribs of larger diameter than the wall 223 to seat against the ends 49 and 51. The edge 62 of the upper dome 59 has two diametrically opposed L-shaped slots 60, only one of which is shown. These slots allow the edge 62 to fit down over the rod end 47 to secure the dome 59 to the wall 223 by pushing the vertical part of these slots down past the rod end and then twisting the dome 59 to cause the rod end to enter the lateral parts of the slots. The dome 59 can be easily lifted off to fill the container with seed by reversing this operation. The interlocking of the L-shaped slot and the ends of the helical rod prevents rodents that jump on the feeder from being able to remove the dome 59 to get at seed inside the container 222. The lower dome 61 has only diametrically opposite holes, not slots, in its edge 63 since it is not necessary to remove that dome as often as the upper one.

The feeder 221 is suspended by a cable 64, one end of which is secured around the rod end 47. The cable passes through a small hole 65 in the top of the dome 59 and may be attached to any suitable support. An apertured disc 66 rests on the edge 63 of the lower dome to allow water accumulated in the container 222 to drain out. The lower dome 61 has an drain opening at its lowest point that is not visible in this figure.

The feeder 221 has a plurality of seed ports 224 that have small openings 67 suitable for thistle seed, like the ports 124 in FIG. 5, but these openings, instead of being created directly in the wall 223, are formed in flat central areas 68 of removable metal inserts that can be snapped into place in openings large enough to accept them.

Figure 10A:
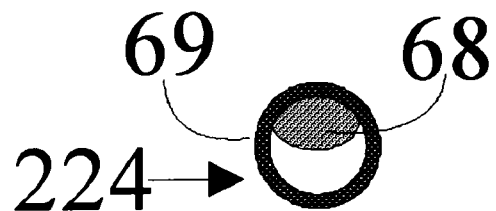
FIGS. 10a and 10b show front and side views, respectively, of a large seed port in FIG. 6.
Figure 10B:
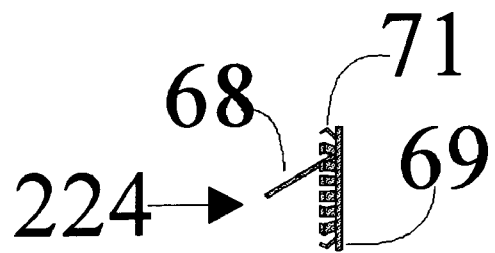

The metal port 224 is shown by itself in FIGS. 10a and 10b. In those figures, it can be seen that substantially all of the flat central area 68 is bent back but remains attached to the rim 69 by a small edge part. This not only creates a larger opening suitable for dispensing large seed, but the central area 68 forms a shield that prevents seed from exiting through the opening except when it is being extracted by a bird. FIG. 10b shows resilient means, such as fingers 71, to hold the port 324 or the similar ports 224 in FIG. 6. in place in an opening of suitable size in the container wall 223.

Figure 11:
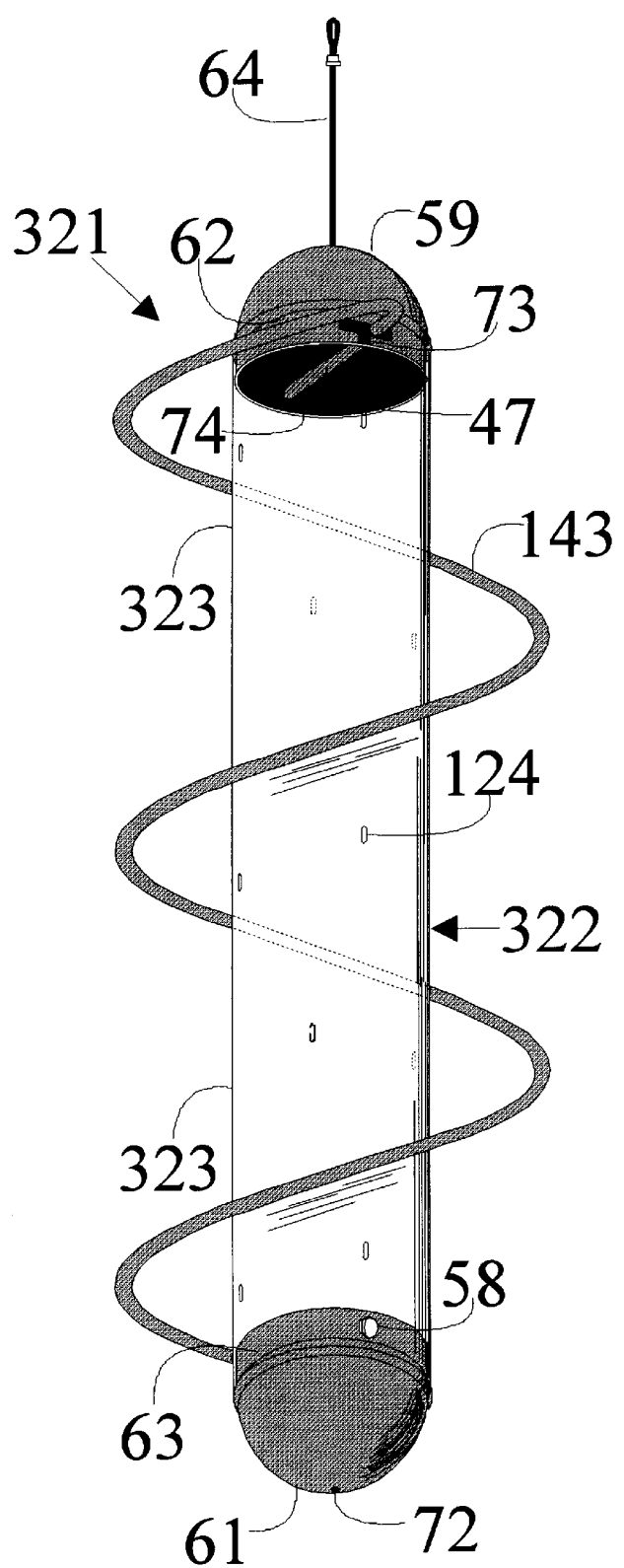
FIG. 11 is a perspective view from below of a feeder similar to that in FIG. 6.

FIG. 11 shows another embodiment of the invention looking up at the bottom of a feeder 321. This view shows the drain hole 72 in the lower dome 61, and it also shows two slots 73 and 74 in the edge of the upper dome 159. These slots are T-shaped, which allows the dome 159 to be locked in place on the feeder by being turned in either direction. In this embodiment, the feeder is intended for use by goldfinches, that prefer thistle seed and will hang upside-down to feed. As a result, the feeder 321 has a container 322 with the same small ports 124 formed in it as were illustrated in FIG. 5, but each of these ports is spaced about two and a half inches below the section of the helical perch 143 that is in the same longitudinal plane that passes through the respective port and through the axis of the container.

If squirrels or other rodents are a problem, all feeder parts may be made of polycarbonate plastic or a weather-proof metal, such as aluminum, stainless steel, etc.

The invention has been described in terms of a specific embodiment, but it will be apparent to those skilled in the technology with which this invention deals that the concept may be embodied in other forms without departing from the true scope of the invention.

What is claimed is:

1. A bird feeder comprising:
    (a) a bird feed container comprising:
        (i) first and second ends spaced apart in a first direction, and
        (ii) a wall surrounding a central region between the first and second ends to hold bird feed and having an inwardly facing surface facing the central region and an outwardly facing surface facing away from the central region;
    (b) a plurality of feeding openings in the wall to provide access to the bird feed in the container, each of the feeding openings facing in a respective direction relative to the central region and being spaced at a respective distance from the first end toward the second end; and
    (c) a generally helical member located outwardly from the wall and extending around the container along a generally helical path between the first and second ends, a respective portion of the helical member being at a predetermined location relative to each of the feeding openings to provide perch means on which birds can perch to reach through the feeding openings to the bird feed within the container.

2. A bird feeder as set forth in claim 1 in which the wall defines hollow tube.

3. A bird feeder as set forth in claim 2 in which the hollow tube is round.

4. A bird feeder as set forth in claim 1 comprising a plurality of pegs attached to the wall to support the generally helical member.

5. A bird feeder as set forth in claim 4 in which the pegs are removably inserted in the wall.

6. A bird feeder as set forth in claim 4 in which the pegs have guide holes directed along a generally helical path, the generally helical member extending through the guide holes.

7. A bird feeder as set forth in claim 1 in which:
    (a) the container is a hollow cylinder and has a central axis; and
    (b) a portion of the generally helical member is aligned at substantially a constant angle relative to each of the feeding openings and is a predetermined distance below each of the feeding openings.

8. A bird feeder as set forth in claim 1 in which the wall of the container is transparent to allow bird feed in the container to be monitored.

9. A bird feeder as set forth in claim 1 comprising a plurality of ports, each removably attached to the wall of the container at each of the feeding openings.

10. A bird feeder as set forth in claim 9 in which each of the ports includes resilient means to grip edges defining the respective feeding opening.

11. A bird feeder comprising:
(a) an elongated hollow body to store bird feed, the hollow body comprising:
(i) top and bottom ends spaced apart in a longitudinal direction:
(ii) top closure means to close the top end, the top closure means being removable to introduce bird feed into the hollow body, and
(iii) bottom closure means to close the bottom end, the bottom closure means being removable to clean the hollow body;
(b) a plurality of feeding openings spaced apart along the hollow body to allow birds access to bird feed; and
(c) a generally helical perch having first and second ends engaging the hollow body adjacent the top and bottom ends, respectively, the perch surrounding the hollow body and being spaced outwardly therefrom along a path that is offset from each of the openings to allow birds sitting on the perch to have access to the bird feed in the hollow body adjacent each of the openings.

12. A bird feeder as set forth in claim 11 in which the hollow body is cylindrical.

13. A bird feeder as set forth in claim 11 in which:
(a) the perch is a generally helical rod with first and second rod ends; and
(b) the hollow body has:
(i) first means adjacent its top end to hold the first rod end, and
(ii) second means adjacent its bottom end to hold the second rod end.

14. A bird feeder as set forth in claim 13, further comprising:
(a) a top cap fitted over the top end of the hollow body, the top cap being removable to permit filling the hollow body with bird feed;
(b) a base cap closing the bottom end of the hollow body to prevent the bird feed from escaping from the hollow body; and
(c) means attached to the hollow body in the region of the top end to suspend the feeder from a support.

15. A bird feeder as set forth in claim 14 comprising first and second rod-receiving means to hold the first and second rod ends to cause the rod ends to bear laterally against the hollow body.

16. A bird feeder as set forth in claim 15 in which:
(a) the first and second rod ends are substantially straight;
(b) the first and second rod-receiving means comprise first and second pairs of rod-receiving holes in the hollow body adjacent the top and bottom ends thereof to allow the rod ends to be inserted into and through said body;
(c) the top cap comprises a first edge overlapping the top end of the hollow body, the first edge having a first pair of rod-receiving openings therein; and
(d) the base cap comprises a second edge overlapping the bottom end of the hollow body, said second edge having a second pair of rod-receiving openings therein, the first rod end extending through the first pair of rod-receiving holes and the first pair of rod-receiving openings, and the second rod end extending through the second pair of rod-receiving holes and the second pair of rod-receiving openings.

17. A bird feeder as set forth in claim 16 in which the first pair of rod-receiving openings in said top cap comprises slots in the first edge to lock the top cap firmly in place around said straightened ends of said generally helical perch.

* * * * *